United States Patent Office 3,164,648
Patented Jan. 5, 1965

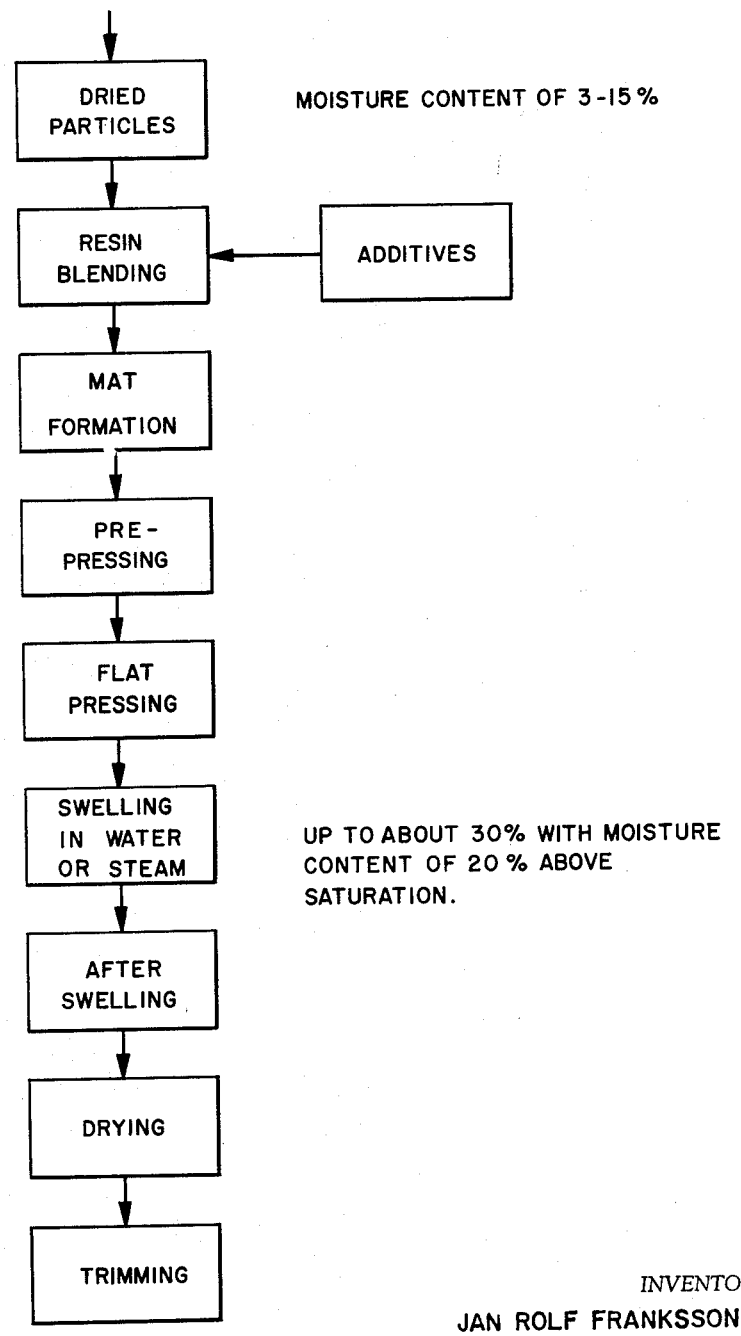

3,164,648
METHOD IN THE PRODUCTION OF COMPRESSION MOULDED OBJECTS
Jan Rolf Franksson, Nacka, Sweden, assignor to Aktiebolaget Casco, Stockholm, Sweden, a Swedish joint-stock company
Filed Oct. 16, 1961, Ser. No. 145,500
Claims priority, application Sweden, Oct. 24, 1960, 10,189/60
5 Claims. (Cl. 264—109)

The invention relates to a method of stabilizing the dimension of particle board used in the production of compression moulded cellulose materials, e.g. chipboards and other products of nondefibrated cellulosic fibrous material, such as wood chips, wood waste, flax shives, bagasse and so on. These objects are produced under heat and pressure with the aid of a resinous bonding agent. The method is described below in connection with the production of chipboards, but it is implied that it may be used in applicable parts also to other materials.

The manufacture of chipboards has lately got an ever increasing extent. Generally chips are now made from high quality cut wood material which is dried to a moisture content considered suitable in glueing (3 to 15%). Moisture content in the present sense is understood to be the ratio between the amount of moisture and the quantity of the dried material. Usually the glue is spread directly on to the dried chips. The glue types now used commercially consist of urea resin glue, phenolic resin glue, and melamine-urea resin glue. An important property of the finished board and of compression moulded products is the dimensional stability of the product at varying moisture contents. In order to obtain the desired dimensional stability, one has been heretofore compelled to supply a moisture repellent agent to the chips, said agent being, as a rule, mixed into the glue before spreading the latter. It has been observed that a urea resin glued chipboard with the individual chips substantially parallel with the plane of the board is normally subjected to a thickness increase of 8 to 12% after storing for 24 hours in water at 20° C. The same result is obtained with boards glued with melamine-urea resin. When using conventional phenolic resin glues the thickness increase for such boards amounts to not less than about 15 to 30% after storing in water for 24 hours. In chipboards which have been moulded with the chips perpendicularly to the plane of the board the change of the dimensions at varying moisture contents will substantially constitute an equally great percentual change of the length and width of the board.

The cost of materials and the properties of the finished chipboards depend to a great extent upon the bulk density which, as regards commercial products, varies within rather wide limits (urea resin boards 0.50–0.70 tons/m.$^3$, phenolic resin glued board 0.65 to 0.80 tons/m.$^3$).

It has now been discovered in the present invention that chipboards once swollen and redried can be remoistened to have a substantial volume increase remaining and stabilized, e.g., that the boards treated by the method of the invention will have a remarkably high degree of dimensional stability after renewed moistening. This characteristic property of chipboards is, according to the present invention, utilized for the production of a dimensionally stable product with low bulk density. It is in fact possible to obtain about 20% lower bulk density and swelling of 3 to 5% after storing for 24 hours in water, which must be considered as an extremely good value, especially with respect to the fact that no moisture repellent agent is added. The strength of board material thus treated is generally unchanged after drying and substantially quite comparable with that of commercial untreated boards.

The characteristic feature of the method according to the present invention is that the moulded objects are retreated to be given a moisture content exceeding 20%, e.g. 20 to 100%, and are thereafter dried and trimmed. The desired moisture content can be obtained by soaking the objects in water or treating them with steam. Simultaneously with this rehumidifying treatment a fireproof agent may be added and also antimicrobial chemicals may be supplied for protection against rot, termite attacks and so on. The drying is carried out to a controlled moisture content of 6 to 20%.

In the production of chip board the the chips are first dried in the usual manner whereafter the glue binder is spread thereover. As a rule, it is not desirable to add a moisture repellent agent because this only delays the swelling at the subsequent treatment and works harm to carrying out the present method. After the glued, untrimmed boards have been hardened, the edges are sawed, whereupon they are soaked in water and, for example, are piled horizontally in packs suring soak. The water soaking shall be extended only over a time sufficient to supply as much water to the boards as the wood or the material contained in the boards needs to reach its fiber saturation point. Of course, more water may be added without sacrificing the quality of the finished product. Depending upon the species of chips used, the boards can be soaked until the moisture content reaches 100% or even 150%. However, this results in prolonged drying time and subsequent decrease of economy since in any case, the boards must be dried to attain the desired final moisture content. For out-of-door use the boards may be dried to about 18%, for carpenter's purposes to about 13% and for furniture manufacture to about 8% moisture content. These values are, of course, dependent upon the climate conditions. After drying the boards are trimmed in the usual manner.

The advantages obtained according to the present method are as follows:

(1) Boards with high dimensional stability can be produced.

(2) Boards with low bulk density and maintained strength properties are obtained. This means a considerable saving of material. Phenolic resin glued, weatherproof boards can therefore be produced at about the same cost as urea resin glued standard boards in spite of the extra cost for swelling and drying.

(3) Moisture repellent agents need not be added.

(4) The boards can be impregnated at a low cost against termite attacks, fire, rot and so on.

The method according to the invention is illustrated more particularly with reference to the following examples.

*Example 1*

Phenolic resin glued chipboard is produced according to conventional methods. The moisture content of the surface chips is about 7% before the glueing and that of the intermediate chips to about 5% before glueing. The resin content is 7% calculated upon dried chips in the surface layer and to 6% in the middle layer. No moisture repellent agent is added. The bulk density of the board amounts to 0.685 g./cm.$^3$ and its thickness is 10 mm. At a compression moulding temperature of 150° C. the press time is 10 minutes. The closing time is 30 seconds.

After compression, the board is sawed to the size 225 x 225 mm. and the sawed boards are stacked thereafter horizontally in piles and soaked in a water bath at 20° C. for 2 hours. The boards are now swollen about 18% in thickness at 50% water absorption, and are dried in a drying closet to about 13% moisture content at 60° C. During the first part of the drying, the boards continue to swell to a thickness increase of about 25% due to the hot steaming to which they are subjected at the beginning of the drying. After drying is completed, it can be established that the boards shrink by only a few percent so that a residual swelling thickness of about 20% is obtained.

The dried boards are then trimmed in the usual manner, i.e. the boards swollen to 12 mm. are trimmed back to a 10 mm. thickness by which a surface is obtained which is fully comparable dimensionally with the requirement for standard chipboard. The testing of treated boards indicates excellent quality. The subsequent swelling in water after 24 hours is scarcely 5% and after 96 hours scarcely 6%. The transversal tensile strength is scarcely 5 kg./cm.$^2$ and the bending strength about 400 kg./cm.$^2$. Untreated boards swell after 24 hours to 22% and after 96 hours to about 28%. The transversal strength is about 5 kg./cm.$^2$ and the bending strength about 450 kg./cm.$^2$. Thus, by the method of the invention, a lighter chipboard is obtained having a bulk density which has decreased only slightly from 0.685 to 0.60 at 13% moisture content. The original good strength is retained, the water swelling properties are improved; and, at boiling tests, the board proves to be acceptably weatherproofed, so that it can be used out-of-doors without risk of undue warping based on moisture changes. The results will be seen in Table 1.

In order to show that shrinking does not occur at lower moisture contents, boards were dried to moisture contents between 0 and 3%. These boards did not shrink further, but the thickness swelling of about 20% was maintained.

*Example 3*

In connection with the swelling of the thickness effected in the Examples 1 and 2, fireproof agents were supplied to the boards. The water bath contained 20% of fireproof agent. The chipboards were soaked long enough in the water bath mixture in order to absorb a quantity of fireproof agent sufficient to obtain resistance to flammability. The water swelling properties and the strength of the boards were not deteriorated by this fireproof impregnation. The bulk density which decreased without fireproof agents, was in this case almost unchanged due to the fact that the boards absorbed about 10% of fireproof agent (see Table 1).

*Example 4*

Chipboards were produced in the conventional manner from pine chips according to the method stated in Example 1, first paragraph, and were kept horizontally in a water bath which contained a 3% aqueous solution of a wood impregnation agent consisting of copper salts and pentachlorophenol. After 24 hours storing in water, an average moisture content of 98% was obtained, which after further 120 hours storing in water had risen to 142%. The boards were then placed in a drying closet for three hours and were dried to 10% moisture content at 60° C., after which they were tested in the same manner as the products according to the foregoing examples. There was no difference between these boards and the boards produced according to the previous tests as regards swelling. Strength and dimensional stability of the finished boards were quite comparable with the results obtained according to Example 1. On the other hand, the drying time was extended due to the greater quantity of water which had to be removed by drying.

TABLE 1

| Ex. | | Swelling in water, percent | | | | Water absorption, percent | | Strength kg./cm.$^2$ | | Bulk density |
|---|---|---|---|---|---|---|---|---|---|---|
| | | 2 hrs. | 24 hrs. | 96 hrs. | Max. | 2 hrs. | 24 hrs. | Transversal tensile strength | Bending strength | |
| 1 | Phenolic resin glued chipboard treated according to the invention. | 3.5 | 4.6 | 5.6 | ca. 8 | 39 | 49 | 5.3 | 400 | 0.595 |
| | Phenolic resin glued chipboard without moisture repellent agents. | 17.5 | 22 | 28 | ca. 30 | 50 | 70 | 5.4 | 450 | 0.685 |
| | Phenolic resin glued chipboard with moisture repellent agents. | 5.5 | 16 | 24 | ca. 30 | 20 | 55 | 5.0 | 450 | 0.690 |
| 2 | Urea resin glued chipboard treated according to the invention. | 4.5 | 8 | 10 | | 30 | 40 | 2.5 | 200 | 0.550 |
| | Urea resin glued chipboard without moisture repellent agents. | 17.5 | 22 | 28 | | 60 | 77 | 4.0 | 290 | 0.650 |
| | Urea resin glued chipboard standard with moisture repellent agents. | 5.5 | 10 | 24 | | 19 | 43 | 4.0 | 280 | 0.650 |
| 3 | Phenolic resin glued chipboard according to the invention with fireproof-impregnation. | 3.7 | 4.8 | 5.7 | ca. 8 | 41 | 50 | 5.2 | 400 | 0.660 |

*Example 2*

In the same way as in Example 1 tests were made with urea resin glued chipboard. The moisture content of the surface chips amounted to about 7% before the glueing and that of the intermediate chips to about 5%. The resin content was 8% calculated upon dried chips in the surface layer and in the intermediate layer. No moisture repellent agent was used. The bulk density of the boards was 0.65 and their thickness was 19 mm. The compression moulding temperature was 140° C. and the press time was 10 minutes. The closing time was 30 seconds.

In this case, the properties of the boards were also characterized by low swelling in water. On the other hand, they were not weather-proof. The bulk density of the boards diminished only from 0.65 to 0.55 by the 20% increase of thickness. The boards compressed to a thickness of 19 mm. had, after swelling in water and drying, a thickness of almost 23 mm. After trimming to a thickness of 20 mm. the surfaces were acceptable within standard requirements. The results will be seen in Table 1.

What I claim is:

1. In the manufacture of compressed cellulosic particle board consisting of non-defibrated wood chips having a moisture content of from 3 to 15%, said chips having different moisture swelling characteristics along the direction of the cellulosic fibers than transverse thereto; said wood chips in the dry state being surface treated with a water resistant thermosetting synthetic resin binder selected from the class consisting of phenol formaldehyde resin, urea-formaldehyde resin, and melamine formaldehyde resin and thereafter formed as a sheet by molding under heat and pressure; that improvement for stabilizing the thickness dimension of the molded particle board after molding and prior to storing and using consisting of uniformly impregnating the molded particle board with moisture for a period of time of at least several hours until an amount of water of at least about 20 up to 100% by weight of said board is picked up by said board to thereby swell the thickness from about 7% to about 30%, then drying the moisture treated board until the moisture content is reduced below 20% and down to 6% by weight of said dry sheet and trimming the dried sheet to reduce the thickness to the pre-determined value whereby a dimensionally stabilized board is produced.

2. A method as claimed in claim 1 wherein the molded particle board is made of fir chips, the resin is phenol formaldehyde and the board is cut into units, the units put into stacks and the stacks are immersed in a water bath at room temperature for several hours to achieve a moisture content of about 50% and a thickness increase of about 18%.

3. A method as claimed in claim 1 wherein the molded particle board is made of fir chips, the resin is urea-formaldehyde and the board is cut into units, the units put into stacks and the stacks are immersed in a water bath at room temperature for several hours to achieve an increase in thickness of about 20%.

4. A method as claimed in claim 1 wherein the molded particle board is made of fir chips and the resin is melamine formaldehyde.

5. A method as claimed in claim 1 wherein the molded particle board is treated with steam in order to bring about a pick-up of moisture greater than 20%.

References Cited by the Examiner
UNITED STATES PATENTS

| 2,638,421 | 5/53 | Serres | 18—47.5 XR |
| 2,743,758 | 5/58 | Uschmann | 18—47.5 XR |
| 2,876,153 | 3/59 | Dorland et al. | 18—47.5 XR |
| 2,994,620 | 8/61 | Franck et al. | |

OTHER REFERENCES

"Conditioning Particle Boards" (R. Fischer), FAO/ECE/BOARD CONS, paper 5.37.

"Fiberboard and Particle Board," published by Food and Agriculture Organization of the U.N. (printed 1958), pages 9, 51, 52, 63, 67, 68, 73 and 74.

ALEXANDER H. BRODMERKEL, *Primary Examiner.*

RICHARD D. NEVIUS, *Examiner.*